UNITED STATES PATENT OFFICE.

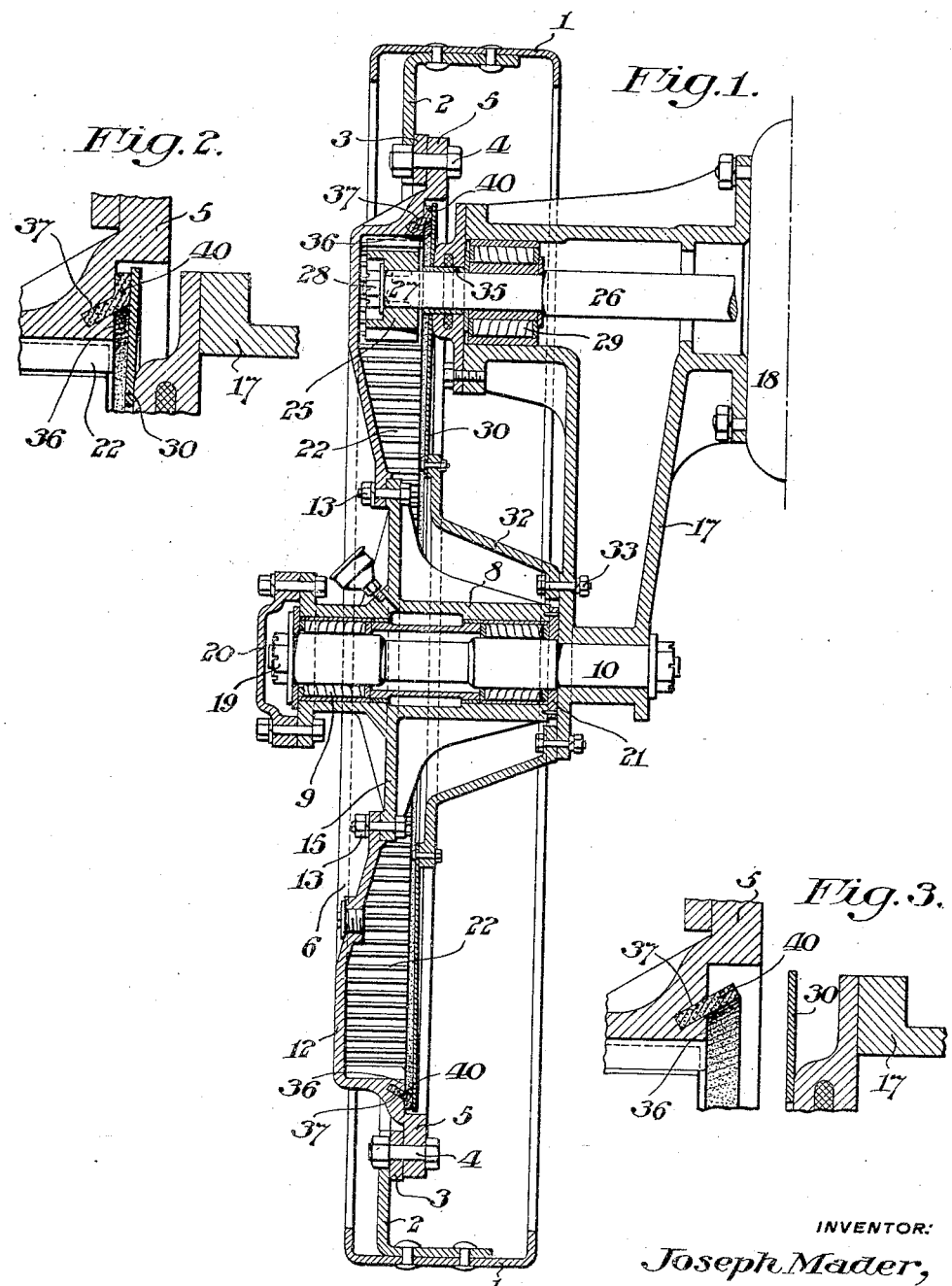

JOSEPH MADER, OF PHILADELPHIA, PENNSYLVANIA, ASSIGNOR TO S. L. ALLEN & CO., INC., A CORPORATION OF PENNSYLVANIA.

DUST-GUARD.

1,383,003.            Specification of Letters Patent.     Patented June 28, 1921.

Application filed May 18, 1920. Serial No. 382,233.

*To all whom it may concern:*

Be it known that I, JOSEPH MADER, a citizen of the United States, and a resident of Philadelphia, county of Philadelphia, and State of Pennsylvania, have invented certain new and useful Improvements in Dust-Guards, of which the following is a specification, reference being had to the accompanying drawing.

Although my invention is adapted for use in connection with various forms of machinery, it relates more particularly to farm tractors of the class in which power is supplied to the driving wheels through the medium of relatively large internal ring gears or "bull wheels" operatively connected thereto, each being coöperative with a drive pinion through which the power is transmitted from the motor. To secure efficient operation, means must be provided for preventing the entrance of dust and grit to the interiors of the bull wheels and also for retaining suitable lubricant therein, and a principal object of my invention is to provide means for this purpose which are efficient in operation, which are adapted to automatically compensate for wear, and which comprise but a relatively small number of parts.

Further objects of my invention are to provide means of the character aforesaid which, owing to the simplicity and arrangement of the various elements, will operate for relatively long periods without the necessity for replacement of any of the parts or care or adjustment of any kind and in which, when required, replacement or renewal of the single part subject to appreciable wear may be readily made by the ordinary tractor operator, without necessity for the services of a skilled mechanic, without machine work, and in a relatively short period of time.

My invention further includes all of the other objects and novel features of construction and arrangement hereinafter more definitely specified and described.

While my invention, as hitherto stated, is adapted for use in connection with various classes of machinery, I have herein illustrated and will now proceed to describe one embodiment thereof as applied to one of the wheels of a farm tractor, only referring to so much of the mechanism of the tractor as is requisite for adequate comprehension of the invention. In the drawing, Figure 1 is a vertical central section through a tractor wheel, bull wheel and adjacent parts, certain of which I have shown in elevation, and illustrating a preferred embodiment of my invention; Fig. 2 is an enlarged fragmentary section of similar character illustrating details of the invention, and Fig. 3 is a view similar to Fig. 2 but showing the parts before being assembled in operative relation as shown in Figs. 1 and 2.

Referring now more particularly to the various figures, in which similar numerals are employed to designate corresponding parts, the tractor wheel 1 is provided with spokes 2 having their inner ends connected to a ring 3, which is suitably secured, as by bolts 4, to the outwardly directed peripheral flange 5 of the bull wheel 6 which, in turn, is carried on a peripherally flanged hub or sleeve 8 supported on anti-friction bearings 9 upon a stub axle 10. In the form of construction shown the bull wheel is provided on its outer side with an inwardly directed peripheral flange 12 which may conveniently be dished laterally toward its center and is adapted to engage with, be supported upon and suitably removably secured to the peripheral flange 15 of the hub 8 as by bolts 13, as clearly shown in Fig. 1.

The stub axle 10 is stationarily secured in a downwardly depending bracket 17 maintained in operative fixed relation with the body 18 of the tractor (not shown), while the hub 8 is removably secured on, and prevented from longitudinal displacement with respect to the axle by any suitable means, as for example, a washer and a castellated nut 19 carried on the outer end of the axle. A hub cap 20 is preferably secured to the outer extremity of the hub to prevent the entrance of dirt to the interior thereof, the hub being conveniently closed at its opposite end by a washer 21 interposed between bracket 17 and the inner end of the hub.

The inner periphery of the bull wheel is provided with suitable gear teeth 22 adapted to engage a pinion 25 rigidly secured on the outer extremity of a power shaft 26 as by keys 27 and a castellated nut 28, the shaft extending inwardly to connect with a suitable source of power (not shown) and being supported in suitable bearings 29 positioned in bracket 17, the whole arrangement being such that power communicated from the pinion to the bull wheel is in turn transmitted to the wheel 1 to rotate the same.

The various parts hitherto described which are effective to support and drive the tractor wheel form no part of the present invention, and may therefore be of any construction and arrangement suitable to effect their intended functions, as will be well understood by those familiar with the art, and in consequence, further and more detailed description thereof is deemed unnecessary.

As hitherto stated, the bull wheel is ordinarily provided with the inwardly directed flange 12 which is secured to the peripheral flange 15 of the hub when the parts are assembled in operative position, so that the entrance of dust or other foreign matter to the interior of the bull wheel from its outer side is entirely prevented, but to secure efficient operation, means must be provided for preventing the entrance of such material, and the exudation of such lubricant as may be employed on the gear and pinion, from the inner or open side of the bull wheel, which means in the preferred embodiment of my invention may comprise a suitable, preferably slightly resilient metallic member maintained in fixed relation with the bracket 17 and a flexible, preferably somewhat resilient element suitably carried by the bull wheel and contacting and coöperating with the metallic member. More particularly, the metallic element may comprise an annular disk 30 preferably formed of sheet metal and supported adjacent its inner periphery on an outwardly flanged annular support 32 operatively rigidly secured to the bracket 17, as by suitable bolts 33, the disk being provided with a suitable aperture for the passage of the shaft 26, or a sleeve 35 conveniently surrounding the shaft at this point and in which it is adapted to rotate.

The disk is of sufficient diameter to extend entirely over the open side of the bull wheel and to overlap the surface 36 thereof, which is conveniently formed by facing off the side of the bull wheel between the roots of the teeth 22 and the inner extremity of flange 5 so as to provide a plane surface normal to the axis of rotation of the wheel surrounding the teeth and adjacent the flange. With the parts in unassembled relation as shown in Fig. 3, the disk lies at right angles to the axis of rotation of the wheel, but when the parts are assembled as hereinafter described the outer periphery of the disk is sprung slightly inwardly, as shown in Figs. 1 and 2, thereby putting the disk under some tension and forcing it to a position from which it constantly tends to return to its original position normal to the said axis of rotation.

The bull wheel near its periphery is provided with a slot 37 cut into the metal from the surface 36 and extending entirely around the bull wheel, the slot being preferably formed with its parallel sides in angular relation with the axis of rotation of the bull wheel, so that the mouth of the slot is farther from such axis than is its bottom. While in different constructions the angle between the sides of the slot and the axis of the wheel may be varied, I prefer to utilize an angle of about 30°, as shown in the drawing.

The slot 37 is adapted to receive one edge of a strip of felt 40 or other substantially similar, preferably flexible and somewhat resilient material, of suitable thickness to fill the slot and of such width that when inserted in the slot to a point at which the strip contacts with the bottom thereof, the strip will preferably project beyond the mouth of the slot for a distance approximately equal to the depth of the slot, while, owing to the angular disposition of the slot in the bull wheel, the strip, when inserted therein, will flare outwardly, as best shown in Fig. 3, prior to the assembly of the various parts.

In assembling the various elements when constructed substantially as hereinbefore described, the bull wheel is moved longitudinally inwardly toward the flange 15 on the hub 8, thus bringing the free edge of the strip 40 into engagement with the disk 30 prior to the seating of the flange 12 on the flange 15, and as the longitudinal movement of the bull wheel is continued to bring these parts into coincidence, the strip is bent outwardly by its contact with the disk until its free portion contacts with the adjacent surface 36 of the bull wheel, after which the further continued movement of the latter as the bolts 13 are set up to secure the bull wheel to the flange 15 tends, after the limit of compression of the strip has substantially been reached, to spring the free edge of the disk from its normal position shown in Fig. 3, to the slightly dished position shown in Figs. 1 and 2.

Under these conditions, while the bull wheel carrying the strip 40 is free to rotate about the axis 10, the strip forms a tight seal between the disk 30 and the bull wheel, thus excluding the entrance of any foreign matter into, or the exudation of any lubricant from, its interior, while, since owing to its inherent resiliency, the disk constantly tends to return from its dished to its initial position and thus always presses tightly against the strip, any wear between the strip and the disk is automatically compensated until after long usage the portion of the strip in contact with the disk becomes too thin to longer provide an efficient seal. When this condition is reached, the strip may be readily renewed by taking off the bull wheel, removing the old strip, inserting a new one, and reassembling the parts, an operation which can be performed with tools of the simplest character and not requiring the services of a mechanic.

While I have herein described and illustrated with some particularity a preferred form of my invention in connection with one of the wheels of a usual type of farm tractor, it being of course understood that the invention under such circumstances will ordinarily be similarly applied to the other wheel or wheels of the tractor as well, I do not thereby desire or intend to limit myself to the employment of the invention solely with machinery of that general nature, as the same is adapted for use, and may readily be utilized in connection with other forms of machinery, and the details of construction and arrangement of the various parts may be modified as desired in order to adapt the invention to different conditions encountered in practice without departing from the spirit and scope of the invention as defined in the appended claims.

Having thus described my invention, I claim and desire to protect by Letters Patent of the United States:

1. The combination with a rotatable element and a relatively stationary element, of means for excluding dust from the interior of said rotatable element, said means comprising a member fixed with respect to said stationary element, and a flexible member carried by said rotatable element and normally inclined with respect to the axis of rotation thereof, a portion of said flexible member being adapted by contact with said stationary member to be bent to a position substantially perpendicular to said axis when said elements are in operatively assembled relation.

2. The combination with a relatively stationary element and an element rotatable with respect thereto, of means for preventing the entrance of dust to the interior of said rotatable element, said means comprising a disk supported on said stationary element and extending across said rotatable element, and a flexible member carried by said rotatable element and normally disposed in angular relation to the axis of rotation thereof, a portion of said member when said elements are in operative assembled relation being bent by contact with said stationary element to assume a substantially perpendicular position with respect to said axis, and forming a seal between said rotating element and said disk.

3. The combination with a relatively stationary element and an element rotatable with respect thereto, of means for preventing entrance of foreign matter to the interior of said rotatable element, said means comprising a disk supported by said stationary element and normally positioned in a plane at right angles to the axis of rotation of said rotatable element, and a flexible member carried by said rotatable element and normally disposed in angular relation to its axis of rotation, said flexible element being operative to force said disk out of its normal plane and through contact with said disk to be bent outwardly to assume a position substantially perpendicular to the axis of rotation of said rotatable element when said elements are in assembled relation.

4. The combination with a tractor having a bull wheel and a supporting member relatively fixed with respect thereto, of means for preventing entrance of dust to the interior of said bull wheel comprising a disk fixed with respect to said supporting member and extending over the open side of said bull wheel, and a flexible member carried by said wheel and rotatable therewith, said member being operative when the parts are in assembled relation to contact with said disk and force said disk out of its normal plane.

5. The combination with a tractor having a bull wheel and a supporting member relatively fixed with respect thereto, of means for preventing entrance of dust to the interior of said bull wheel comprising a disk fixed with respect to said supporting member and extending over an open side of said bull wheel, and a flexible member carried by said bull wheel and normally disposed in angular relation to its axis of rotation, said member being adapted when the parts are in assembled relation to contact with the periphery of said disk, whereby said disk is forced from its normal alinement and said member bent to a position substantially perpendicular to the axis of rotation of said wheel, the tendency of said disk to return to its normal position being operative to press said flexible member against the face of said wheel.

6. The combination in a tractor having a relatively stationary supporting member and a bull wheel rotatable with respect thereto, of means for preventing the entrance of foreign matter to the interior of said wheel comprising a disk fixed with respect to said supporting member, and a strip of felt carried by said bull wheel and normally extending beyond the face thereof in angular relation to the axis of rotation of said wheel, said felt being operative when the parts are assembled to contact with and spring said disk from its normal plane and to be bent over to contact with the face of said wheel, whereby said strip forms a seal between said disk and said wheel, said disk tending to return to its normal position serving to continuously compress said strip against the latter.

7. In a tractor having an internally toothed bull wheel, means for rotating said wheel and a support relatively fixed with respect thereto, of a metallic disk fixed with respect to said support and extending over an open face of said wheel, and a strip of resilient material disposed in a slot formed in said wheel and in angular relation with its axis of rotation, said material being operative to contact with the periphery of said disk and to force said disk from its normal position when the parts are in assembled relation, whereby said disk is caused to constantly press said strip against the face of said wheel to effect a dust proof closure between said disk and said face.

In witness whereof, I have hereunto set my hand this 17th day of May, A. D. 1920.

JOSEPH MADER.